(12) United States Patent
Børstad et al.

(10) Patent No.: US 10,642,370 B2
(45) Date of Patent: May 5, 2020

(54) PROXIMITY DETECTION (71) Applicant: Elliptic Laboratories AS, Oslo (NO)

(72) Inventors: Thomas Børstad, Oslo (NO); Tom Kavli, Nittedal (NO)

(73) Assignee: ELLIPTIC LABORATORIES AS, Oslo (NO)

( * ) Notice: Subject to any disclaimer, the term of this patent is extended or adjusted under 35 U.S.C. 154(b) by 5 days.

(21) Appl. No.: 16/075,091

(22) PCT Filed: Feb. 9, 2017

(86) PCT No.: PCT/GB2017/050334
§ 371 (c)(1),
(2) Date: Aug. 2, 2018

(87) PCT Pub. No.: WO2017/137755
PCT Pub. Date: Aug. 17, 2017

(65) Prior Publication Data
US 2019/0050061 A1    Feb. 14, 2019

(30) Foreign Application Priority Data

Feb. 9, 2016 (GB) .................................. 1602319.4

(51) Int. Cl.
*G06F 3/043* (2006.01)
*G06F 3/01* (2006.01)
(Continued)

(52) U.S. Cl.
CPC .............. *G06F 3/017* (2013.01); *G01S 15/04* (2013.01); *G01S 15/325* (2013.01); *G01S 15/34* (2013.01);
(Continued)

(58) Field of Classification Search
CPC ........ G06F 3/017; G06F 3/0416; G06F 3/038; G06F 1/3231; G06F 1/3215;
(Continued)

(56) References Cited

U.S. PATENT DOCUMENTS 6,542,436 B1    4/2003   Myllyla
7,263,373 B2    8/2007   Mattisson
(Continued)

FOREIGN PATENT DOCUMENTS

EP    2271134         1/2011
JP    H10-319059 A   12/1998
(Continued)

OTHER PUBLICATIONS

International Search Report and Written Opinion dated Feb. 9, 2017 from International Application No. PCT/GB2017/050334.
(Continued)

*Primary Examiner* — Adam R. Giesy
(74) *Attorney, Agent, or Firm* — Beyer Law Group LLP (57) ABSTRACT

An electronic device (1) such as a cell phone, or a proximity detector for an electronic device (1), has an ultrasound transmitter (5), an ultrasound receiver (6), and a processing system. It transmits an ultrasonic sine-wave signal from the transmitter (5), and receives the ultrasonic sine-wave signal, through air, at the receiver (6). It detects when the frequency of the transmitted signal and a frequency of the received signal satisfy a predetermined difference criterion, and uses this to determine whether to disable or enable a touch or touchless input (2) on the device (1).

19 Claims, 4 Drawing Sheets

(51) Int. Cl.

| | | |
|---|---|---|
| *G01S 15/32* | (2006.01) | |
| *G01S 15/34* | (2006.01) | |
| *G01S 15/04* | (2006.01) | |
| *G01S 15/52* | (2006.01) | |
| *G01S 15/88* | (2006.01) | |
| *G01S 15/58* | (2006.01) | |
| *G06F 1/16* | (2006.01) | |
| *G06F 1/3215* | (2019.01) | |
| *G06F 1/3231* | (2019.01) | |
| *G06F 3/038* | (2013.01) | |
| *G06F 3/041* | (2006.01) | |
| *G01S 7/521* | (2006.01) | |

(52) U.S. Cl.
CPC .......... *G01S 15/523* (2013.01); *G01S 15/586* (2013.01); *G01S 15/88* (2013.01); *G06F 1/1684* (2013.01); *G06F 1/3215* (2013.01); *G06F 1/3231* (2013.01); *G06F 3/038* (2013.01); *G06F 3/0416* (2013.01); *G01S 7/521* (2013.01); *G01S 15/526* (2013.01)

(58) Field of Classification Search
CPC ........ G06F 1/1684; G01S 7/521; G01S 15/04; G01S 15/526; G01S 15/88; G01S 15/586; G01S 15/523; G01S 15/34; G01S 15/325
See application file for complete search history.

(56) References Cited

U.S. PATENT DOCUMENTS

| | | | |
|---|---|---|---|
| 7,414,705 B2 | 8/2008 | Boillot | |
| 9,733,720 B2 | 8/2017 | Kavli et al. | |
| 2005/0058021 A1 | 3/2005 | Feintuch et al. | |
| 2013/0147770 A1* | 6/2013 | Dahl | G06F 1/3215 345/177 |
| 2013/0154919 A1 | 6/2013 | Tan et al. | |
| 2013/0229508 A1 | 9/2013 | Li et al. | |
| 2016/0091308 A1* | 3/2016 | Oliaei | G01B 17/00 367/89 |

FOREIGN PATENT DOCUMENTS

| | | |
|---|---|---|
| JP | 3850950 | 11/2006 |
| WO | 2017/137755 | 8/1917 |
| WO | 2006/067436 | 6/2006 |
| WO | 2009/115799 | 9/2009 |
| WO | 2009/122193 | 10/2009 |
| WO | 2009/147398 | 12/2009 |
| WO | 2010/026395 | 3/2010 |
| WO | 2011/004135 | 1/2011 |
| WO | 2011/036486 | 3/2011 |
| WO | 2011/042748 | 4/2011 |
| WO | 2011/042749 | 4/2011 |
| WO | 2011/048433 | 4/2011 |
| WO | 2012/001412 | 1/2012 |
| WO | 2012/017241 | 2/2012 |
| WO | 2012/022979 | 2/2012 |
| WO | 2012/080752 | 6/2012 |
| WO | 2012/017241 | 9/2012 |
| WO | 2012/131355 | 10/2012 |
| WO | 2012/131359 | 10/2012 |
| WO | 2012/172322 | 12/2012 |
| WO | 2013/045938 | 4/2013 |
| WO | 2013/132241 | 9/2013 |
| WO | 2013/132242 | 9/2013 |
| WO | 2013/132244 | 9/2013 |
| WO | 2013/140130 | 9/2013 |
| WO | 2014/013249 | 1/2014 |
| WO | 2014/125294 | 9/2014 |

OTHER PUBLICATIONS

Ultrasonic Doppler Sensing in HCI, 6 pages, 2012.
Opportunities for Activity Recognition using Ultrasound Doppler, pp. 1-10, 2015.

* cited by examiner

PROXIMITY DETECTION

FIELD OF THE INVENTION

This invention relates to electronic devices that use ultrasonic signals to determine when to enable or disable a touch or touchless input on the device.

BACKGROUND OF THE INVENTION

Mobile devices such as cellphones commonly contain proximity sensors. These can be used to determine when the user's head is close to the device (e.g., within 5 centimeters of a front face of the device), so that the touch input of a touchscreen display can be deactivated during a call. This can prevent unintended inputs to the device due to contact between the device and the user's head. Such proximity sensors typically emit infrared signals and detect changes in the reflected infrared signal returning to the sensors (e.g., changes in amplitude). Such sensors are simple, but they can significantly increase the bill of materials for the mobile device and take up significant additional space on the face of the device.

The applicant has therefore devised an alternative approach.

SUMMARY OF THE INVENTION

From one aspect, the invention provides an electronic device comprising an ultrasound transmitter, an ultrasound receiver, and a processing system, the device being arranged to:
- transmit an ultrasonic sine-wave signal from the ultrasound transmitter;
- receive the ultrasonic sine-wave signal, through air, at the ultrasound receiver;
- detect when the frequency of the ultrasonic sine-wave signal as transmitted by the electronic device and a frequency of the ultrasonic sine-wave signal as received by the electronic device satisfy a predetermined difference criterion; and
- use such a detection to determine whether to disable, or whether to enable, a touch or touchless input on the electronic device.

The skilled person will appreciate that the invention detects movement of an object beyond the device, such as movement of the user's head towards or away from the device, based on the phenomenon of Doppler shift in the reflections of the ultrasonic sine-wave signal from the object back to the device. It uses this movement detection to decide when to turn a touch or touchless input on or off.

A static reflector (relative to the device) does not cause any Doppler shift in the reflected signal, so the presence of a static reflector close to the device cannot be determined directly. However, its presence may be inferred from those times when it is not static, such as when it first approaches the device. This can be determined from Doppler-shift data. (Movement is, of course, being described here relative to the device—the reflector might be static in absolute terms, with the device approaching the reflector.)

The predetermined difference criterion is preferably such as to represent a category of relative movements between the electronic device and an acoustically-reflective surface spaced away from the electronic device. When the received sine-wave signal includes a frequency that meets the difference criterion, this can be used (potentially in combination with other factors) to infer the presence, or absence, of the user's head near to the device. It will be appreciated that this is a fundamentally different approach compared with traditional proximity detection: rather than detecting the presence of an object directly, the device instead uses frequency shifts to determine when an object (having an acoustically-reflective surface) is introduced into, or removed from, the vicinity of the device. The device can base decisions about when to enable/disable the touch or touchless input on this information, by using implicit assumptions about continuity of the object's position in space. For example, if the device (e.g., a cellphone) is brought to the ear, it can reasonably be assumed that the phone continues to be next to the user's ear until a significant movement of a reflector away from the phone is detected.

Many electronic devices already contain acoustic transducers, one or more of which may be reused as the ultrasound transmitter or ultrasound receiver of the present invention, thereby keeping manufacturing costs down. It can also avoid the need to clutter the device with additional transducers in order to provide proximity detection. For example, the ultrasound transmitter and ultrasound receiver may be used additionally to provide a touchless input, for receiving gesture-based user inputs to the device. In some embodiments, the ultrasound transmitter may be a loudspeaker that is also capable of also emitting audible frequencies, such as voice signals during a telephone call. The device may be arranged to use the ultrasound transmitter to emit audible frequencies. The ultrasound receiver may be a microphone that is also capable of receiving audible frequencies, such as voice signals during a telephone call. The device may be arranged to use the ultrasound receiver to receive audible frequencies.

A touchless input is an interface that allows a user to interact with the device without making contact with the device—e.g., by gesturing near the device with a hand or other object.

The applicant has realized that this approach of detecting a difference in frequency can be carried out very computationally efficiently. In particular, it has lower power requirements than traditional ultrasonic ranging techniques, in which short bursts of ultrasound are transmitted, and time-of-flight measurements of reflections of these bursts are used to calculate a distance to an acoustically-reflective surface. The present approach is also able to detect fast movements more reliably than traditional ranging techniques, whose accuracy is limited by the rate at which they transmit their periodic ranging signals. Traditional time-of-flight-based ultrasonic ranging can experience smearing when coded signals are reflected by fast-moving reflectors. Using timing-based ultrasound processing that compares a received signal with a stored reference signal can also lead to false-positive detections due to changing speaker and microphone responses due to changes in temperature (which may occur even over the course of a single telephone conversation). Additionally, Doppler processing has been found to give a better signal-to-noise-ratio (SNR) than traditional time-of-flight approaches, which means that a moving reflector can be tracked reliably at longer distances from the device.

From a second aspect, the invention provides a method of controlling an electronic device, comprising:
- transmitting an ultrasonic sine-wave signal from the electronic device;
- receiving the ultrasonic sine-wave signal, reflected off an object, through air, at the electronic device;
- detecting that the frequency of the ultrasonic sine-wave signal as transmitted by the electronic device and a frequency of the ultrasonic sine-wave signal as received by the electronic device satisfy a predetermined difference criterion; and in response to said detection, disabling, or enabling, a touch or touchless input on the electronic device.

From a third aspect, the invention provides computer software, and a tangible or intangible carrier or memory bearing the same, which, when executing on a processing system in an electronic device, causes the electronic device to:

transmit an ultrasonic sine-wave signal from an ultrasound transmitter of the electronic device;

receive the ultrasonic sine-wave signal, through air, at an ultrasound receiver of the electronic device;

detect that the frequency of the ultrasonic sine-wave signal as transmitted by the electronic device and a frequency of the ultrasonic sine-wave signal as received by the electronic device satisfy a predetermined difference criterion; and use such a detection to determine whether to disable, or whether to enable, a touch or touchless input on the electronic device.

The electronic device may be a cellphone, a tablet computer, a laptop computer, a desktop computer, a domestic appliance, a wearable device, a car, or any other device. In some preferred embodiments it is a mobile device. It may be a proximity sensor or a proximity detector—e.g., a module that can be incorporated into a larger device, such as a cell phone.

The ultrasonic sine-wave signal is preferably transmitted continuously for a period of time—e.g., whenever the device is powered on, or whenever the touch or touchless input is enabled, or whenever the touch or touchless input is disabled, or whenever proximity detection is required, or for the duration of a telephone or video call involving the device. It may therefore on occasions be transmitted for at least 1 second, 10 seconds, 100 seconds, or more. The transmission may cease when the device is in a standby mode or other-reduced power mode, or when it is not in a telephone or video call. Alternatively, the sine-wave signal may be transmitted at intervals—e.g. for durations in the order of 1, 10 or 100 milliseconds, with a gap between successive transmissions.

The device is preferably configured to receive the ultrasonic sine-wave signal at the same time as it transmits the signal (i.e., the signal is transmitted continuously for at least as long as the round-trip time-of-flight from the device to the acoustically-reflective surface). Any direct-path signal from an ultrasonic transmitter to an ultrasonic receiver on the device is preferably filtered out or disregarded.

The frequency of the transmitted ultrasonic sine-wave signal may be fixed, or it may change at intervals. The device may be arranged to detect the presence of ultrasound energy transmitted by another device—e.g. another sine-wave signal—and to change the frequency of the transmitted sine-wave signal in response. It may change it to a frequency that is at least a minimum distance from the interfering signal.

The device may transmit a plurality of ultrasonic sine-wave signals simultaneously. It may be arranged to detect a frequency difference, satisfying a difference criterion, in a reflection of any one or more of these signals, and may use one or a plurality of such detections when determining whether to disable or enable the touch or touchless input. In one embodiment the device may simultaneously transmit a first ultrasonic sine-wave signal at a fixed frequency and a second ultrasonic sine-wave signal that changes in frequency—e.g. changing in frequency in a periodic pattern or cycle.

It will be appreciated that the ultrasonic sine-wave signal as received by the electronic device may comprise a plurality of different frequency components, caused by reflections from a plurality of respective surfaces, which may be moving with difference velocities. The device may consider just one of these frequency components (e.g., the most energetic), or it may consider a plurality of frequency components when testing for the predetermined difference criterion.

The processing system on the device preferably performs the detecting and determining steps, although in some embodiments it is possible that one or both of these steps may be carried out wholly or in part on a remote processing device, such as a remote server.

The processing system on the device preferably includes a Fourier transform processing system, arranged to perform a Fourier transform (e.g., a fast Fourier transform) on output from the ultrasound receiver. The processing system may use a Fourier analysis to detect said difference in frequency. The device preferably down-converts and/or down-samples the received signals before performing the Fourier transform, to reduce computational cost.

In one set of embodiments, the transmitted sine-wave signal has a frequency of about 30 kHz. The received signal may be sampled at a frequency of about 96 kHz. The received signal may be down-converted to complex baseband and may be down-sampled by a factor of 40. The maximum observable frequency shift is then 1.2 kHz, which translates into a relative speed of approximately 7 m/s.

Use of a Fourier transform is not essential, however. Some embodiments detect a frequency difference using Multiple Signal Classification (MUSIC), or another parametric method, or by counting zero crossings. Some embodiments may measure frequency indirectly by estimating an accumulated phase change over a time period.

The processing system may comprise one or more of DSPs, CPUs, ASICs, FPGAs, microcontrollers, digital-to-analog converters, analog-to-digital converters, volatile memory, non-volatile memory, software instructions, and other conventional components.

The difference criterion may apply to instantaneous single values of the transmitted frequency and/or the received frequency. However, the difference criterion may apply to a set or continuum of frequency values for one or both of the transmitted sine-wave signal and the received sine-wave signal.

Preferably the difference criterion is such that it is satisfied whenever an object enters or leaves the vicinity of the ultrasound transmitter and ultrasound receiver, and not when the position of the object is slightly shifted or when spurious movements occur in the environment.

The difference criterion may require the frequencies to have a difference that satisfies any one or more of the following conditions: to exceed a predetermined minimum threshold once or continuously for a predetermined time period; to remain below a predetermined maximum threshold during a predetermined time window; to last for at least a predetermined minimum duration; to last no longer than a predetermined maximum duration; to be positive for at least a minimum time period; to be negative for at least a minimum time period; to have a minimum integral with respect to time (corresponding to relative displacement) over a time period; or any other appropriate condition. These thresholds and time periods are preferably predetermined; they may be controlled by one or more values stored in a memory of the device; they may be configurable by a user and/or by the device itself.

In addition to detecting a frequency difference, the device may also determine one or more of: the magnitude of the frequency difference; the direction of the frequency difference; a rate of change (gradient) of a series or continuum of frequency shifts over time; the amplitude or power of the sine-wave component that is exhibiting the different frequency; and any other information relating to the frequency of the received sine-wave signal.

The device may additionally use one or more of these determinations when determining when to disable or enable the touch or touchless input. For example, whenever the user brings a phone to her ear there will be a distinct and detectable time evolution of frequency shifts in the received signal. The device may require one or more values derived from a frequency difference, or from a succession of frequency differences, to be above (or below) a fixed or variable threshold, before making the determination to enable (or disable) the touch or touchless input. The device may, for example, be configured to detect when a succession of uni-directional frequency shifts (e.g., all positive shifts or all negative shifts) occurs over a predetermined (possibly configurable) minimum time period; this can be indicative of a consistent motion trend. It may determine a measure of reliability of a frequency shift estimate, which it may use to determine whether the frequency difference criterion has been met. The device may determine whether one or more frequencies of the received ultrasonic sine-wave signal satisfy a plausibility test. The plausibility test may require the movement of the object to correspond to realistic physical movements. For example, the plausibility test may fail if motion implied by the frequency shift or shifts is excessively fast, or starts or stops too abruptly. The test may include a maximum speed criterion and/or a smoothness criterion. The device may be configured to disregard received signals that do not have a frequency component (e.g., a fast-Fourier transform bin) that exceeds a threshold amplitude. The device may be configured to disregard received signals that do not have a frequency component (e.g., a fast-Fourier transform bin) having an amplitude whose ratio to an average (e.g., mean) amplitude for the received signal exceeds a threshold ratio.

The difference criterion may place one or more conditions on an absolute frequency of one or both of the transmitted sine-wave signal and the received sine-wave signal. Because Doppler shift scales with the frequency of the transmitted signal, the difference criterion preferably takes account of the frequency of the transmitted sine-wave signal, as well as the difference between the frequencies. However, since the frequency of the transmitted signal is known in advance, the frequency or spectrum of the sine-wave signal as received by the device (instantaneously or over time) may be the only variable to an algorithm that determines whether the difference criterion has been met (although other parameters, such as the ambient temperature, could also be considered).

The device may apply logic rules to evaluate a plurality of factors relating to the received sine-wave signal to determine whether to enable (or disable) the touch or touchless input.

The device may use a finite state machine stored in the device to determine when to disable or enable the touch or touchless input. It may use fuzzy logic or conventional logic. The device may evaluate a proximity test at intervals when determining whether to enable or disable the touch or touchless input. The proximity test may have been created based on an analysis of typical user interactions with an electronic device—for example, analyzing the speed with which a user typically brings a cellphone to her ear when answering a call. As another example, if the device detects a downward frequency shift, indicative of outward motion, but then detects significant variation in a received signal compared with an earlier-received signal, indicative of a reflector still being nearby, it may be configured to keep the touch or touchless input disabled; this is because, in such circumstances, the outward motion may be more likely to be typical of the user withdrawing the phone from his pocket than of removing the phone from his head during a telephone call. It will be appreciated that a proximity test may comprise a set of rules or conditions for determining when to enable or disable the touch or touchless input, of which detection of a received signal meeting the frequency difference criterion is one of potentially a plurality inputs.

The device may be configured to make a series of binary determinations at regular or irregular intervals as to whether or not to enable (and/or whether or not to disable) the touch or touchless input. The output of each binary determination may be stored temporarily in a memory of the device. This binary determination is preferably indicative of whether or not the user's head is likely to be within the vicinity of the device.

The device may be arranged to detect a difference in frequency, and determine when to enable (or disable) the touch or touchless input, when the device is in a particular state, such as when a telephone call is being initiated and/or is on-going. Proximity detection may be disabled when the device is in an alternative state.

The electronic device may comprise a touch-pad or a touch-screen for receiving inputs from the user, typically using a user's finger or a stylus. The device may alternatively or additionally be configured to receive inputs from the movement of an input object through air in front of, but not necessarily touching, an input surface—i.e. touchless or gesture-based interaction. The aforesaid touch or touchless input may comprise the whole of a touch-pad, touch-screen or touchless-sensing region, or it may comprise just a part thereof. It could, for instance, be just part of a touch input mechanism (e.g., just covering part of a touchscreen). The touch or touchless input could comprise a physical button, a voice command interface (or a set of particular voice commands), a camera, a keypad, a touchless gesture input mechanism (or a set of particular gestures), or any other user input system or mechanism. A plurality of such inputs may be disabled or enabled at the same time.

The existence or nature of the touch or touchless input may depend on a state of the device. For example, the touch or touchless input may exist, or be active, only when certain software is executing on the device, such as when a telephone application is active. The input could, for example, comprise a touch-based interface provided by a particular software application, such as a voice-over-IP app running on the device.

A plurality of touch or touchless inputs may be disabled or enabled at the same time. One or more outputs to a user may also be disabled (or enabled) or altered based on such a frequency-difference detection, such as a backlit display, a speakerphone output, a call ringer for an incoming call, a lamp, call volume, or any other output to the user. The device may of course disable or enable a touch or touchless input and also disable or enable an output interface, based on detecting one or more frequency difference criteria being met, or may additionally perform one or more other additional functions in response to detecting a frequency difference satisfying a criterion.

The device may be arranged to use frequency-difference detections to determine whether to disable the touch or touchless input and to determine whether to enable the touch or touchless input, or it may use frequency-difference detections for only one of these two state changes.

The device preferably disables the touch or touchless input, or maintains the interface in a disabled state, when it determines that an object, such as the user's head, is likely to be close to the device, according to a proximity test. Detecting an upward frequency shift or trend in the sine-wave signal as received is preferably a component of this proximity test. The device preferably enables the touch or touchless input, or maintains the input in an enabled state, when it determines that an object, such as the user's head, is unlikely to be close to the device, according to a non-proximity test. Detecting a downward frequency shift or trend is preferably one component of this non-proximity test. The non-proximity test may be the same as the proximity test, but with the binary output inverted.

The proximity test and/or non-proximity test may be based on the value of one or more additional variables, in addition to the frequency-shift detection.

Although proximity detection based on analyzing frequency shifts has many advantages over a timing-based approaches, as explained above, and may be used successfully on its own, in some embodiments it may nevertheless be desirable to use a combination of frequency-shift analysis and timing analysis. The applicant has recognized, for instance, that reliably detecting an approach of the user's head based on frequency analysis alone is more challenging than detecting a receding of the user's head, because there is no readily-available absolute distance information on the approach. By contrast, during a call, the user's head can be assumed to be within a few centimeters of the device (e.g., less than 5 cm away), and so this provides a distance reference point for analyzing subsequent outward motion. For inward motions, the exact point where proximity is detected cannot be guaranteed, but will depend on the reflective properties of the approaching object.

The electronic device may therefore be further arranged to:
  transmit a second ultrasonic signal from the ultrasound transmitter, the second ultrasonic signal having a wider bandwidth than the sine-wave signal;
  receive ultrasonic signals, through air, at the ultrasound receiver, arising from the second ultrasonic signal;
  use the received signals arising from the second ultrasonic signal to determine data representative of a distance to an acoustically-reflective surface spaced away from the electronic device; and
  additionally use said distance data when determining whether to disable the touch or touchless input, or when determining whether to enable the touch or touchless input.

In this way, the device can use both frequency-shift information and distance information to determine whether to disable (or enable) the touch or touchless input. It may combine these information sources in any suitable way to define a proximity test that has a binary output.

The second ultrasonic signal is preferably transmitted at intervals, which may be regular. It may be a pulse or any other type of signal, other than a sine wave. In some preferred embodiments it is a chirp (a rising or falling tone). The device may use pulse compression to calculate one or more impulse responses from the received signals.

The distance information is not necessarily a calculated distance, such as "67 mm", although it may be. It may instead be information relating amplitude to time, for one or more signal transmissions, which can convey distance information in the timings of amplitude peaks associated with one or more reflective objects.

In some embodiments, data derived from an ultrasonic signal received by the device may be compared with stored reference data derived from one or more previously-received ultrasonic signals (e.g., data captured from the microphone when the device is first turned on, or when a telephone call is being initiated or is underway, or shortly after a telephone call has ended). The device may use the detection of the predetermined difference criterion for a received sine-wave signal to determine what reference data to store, or what reference data to compare with a later-received ultrasonic signal.

In some embodiments, data from received signals is stored at intervals in a reference buffer. Ideally, stored data relating to a signal received while a call is initiated (e.g., while a user is dialing a number, or selecting a contact from an address-book), but before the call is connected, would be compared with data derived from one or more subsequently-received ultrasonic signals. Such data would provide a reference for when the user's head is likely not to be close to the device (i.e., before a call starts), but which is still recent, and therefore less susceptible to inaccuracy due to drift over time in a microphone's response. This could then be used to help the device determine when it is removed from the user's head, and therefore when to re-enable the touch or touchless input. In practice, however, this may not be possible, since a mobile telephone may activate a proximity detection module only as a call is connecting or has connected, and not beforehand (e.g., while the user is entering a telephone number). The device may therefore be arranged to look for an approaching reflector (e.g., the user's head) when the proximity detector is activated, or when a call is connecting or is first connected, and only regard stored data as indicative of the user's head not be proximate to the device if such an approach is detected. If no such approach is detected within a time period of a call being connected or being underway, it is likely that the phone was already being held to the user's head before the proximity detector was activated; in this case. the device may use stored data from an earlier call as a reference for a state of being away from the user's head, or it may not perform a comparison operation at all.

In some embodiments, data from received signals is stored at regular intervals in a reference buffer, which provides a set of references over time. The data may be raw signal samples (i.e., amplitude values over time), or any other data derived from the signal. A reference may be selected from the buffer in response to the device determining that a frequency of an ultrasonic sine-wave signal received by the device and the frequency of the transmitted sine-wave signal satisfy a set of one or more selection conditions. The set of selection conditions is preferably such that it is met when an object, such as human head, approaches the device. The set of conditions may include that the received frequency is higher than the transmitted frequency by at least a threshold amount. The selection may depend on other conditions such as a minimum amount of time over which a frequency difference satisfying the set of conditions must be maintained, and/or a minimum or maximum time between receiving the two frequencies.

The selected reference preferably corresponds to a signal received by the device before said sine-wave signal was received by the device. In this way, it can be a strong candidate for describing the environmental acoustic "signature" that existed moments before the user brought the device to his or her head. A selected reference may be added to a bank of selected references. The reference bank may be separate from the reference buffer—e.g., located in a different region of memory—or it may be a subset of the references in the reference buffer, identified in any appropriate way (e.g., by storing a "selected" flag alongside references in the reference buffer), The device may be arranged to assign a confidence score to each reference in the reference bank. The confidence score may depend on any one or more of: the amplitude of the frequency in the received ultrasonic sine-wave signal, received after the signal from which the selected reference is derived; a ratio of the amplitude of the frequency in the received sine-wave signal to an average (e.g., mean) amplitude over all or a band of frequencies in the received sine-wave signal; a measure of similarity between the reference and any reference already in the bank; an age of the reference; and a measure of similarity between the reference and the immediately preceding reference in the reference buffer.

The device may be configured a perform a comparison operation between a reference that has a highest confidence score out of all the references in the reference bank and a later-received signal. The device may use this comparison operation to determine (possibly in combination with other factors, such as detecting a receding Doppler signal) whether to enable (or whether to disable) the touch or touchless input.

The received signals used for comparing may arise from a transmitted sine wave signal, or a transmitted chirp signal, or some other signals. The received signals may be analyzed for variation—for instance by comparing the response to an earlier response. For example, where a succession of second signals is transmitted, echoes of one transmission may be compared with echoes of a preceding transmission. If data derived from a received signal is determined to differ from stored reference data in such a way as to satisfy a predetermined difference criterion (or, equivalently, to satisfy a predetermined similarity criterion), the device may use this when determining when to disable the touch or touchless input, or when determining when to enable the touch or touchless input. This difference (or similarity) criterion may be based on amplitude, timing and/or frequency differences.

In some embodiments, a sine-wave signal may be used to determine when to disable the touch or touchless input, using the difference/similarity criterion as explained above, and a comparison operation may be used to determine when to enable the touch or touchless input. The sine-wave signal may also be used to determine when to store reference data for the comparison operation (e.g., before and/or during a telephone call).

The device comprises an ultrasound transmitter and an ultrasound receiver. These may be the same transducer, or they may be separate. They may be individual transducers or one or both of them may comprise a plurality of transducer elements—for example, in an array, or distributed over the device. In some embodiments, the device may comprise an ultrasound transmitter and an ultrasound receiver positioned proximate to a loudspeaker of the device that is used for emitting audible sound, such as during a telephone call. Proximate here may be on the same half, quarter or eighth of the device by volume, or adjacent a common edge of a display screen of the device, or on the same edge face of the device, or within a common half, quarter or eighth of the surface-area of a surface or face of the device containing the loudspeaker, ultrasound transmitter (which may be the same loudspeaker) and ultrasound microphone. By locating the ultrasound transmitter and ultrasound receiver close to the loudspeaker, the likelihood of reliable detection of the user's head is increased, since the loudspeaker is more likely to be closer to the user's ear when the device is close to the user's head than is the case for other parts of the device. Such an arrangement can also reduce the chance of the device disabling (or enabling) an input when an object that is not the user's head approaches the device—for example, when the user's hand approaches a touchscreen display of the device in order to enter data into the device, while a speakerphone call is already underway.

From a further aspect, the invention provides an ultrasonic proximity detector for use in an electronic device, wherein the ultrasonic proximity detector is arranged to:
   transmit an ultrasonic sine-wave signal continuously or at intervals; and
   transmit second ultrasonic signals at intervals, the second signals having a greater bandwidth than the ultrasonic sine-wave signal.

This aspect extends to a method of detecting proximity, comprising:
   transmitting an ultrasonic sine-wave signal continuously or at intervals; and
   transmitting second ultrasonic signals at intervals, the second signals having a greater bandwidth than the ultrasonic sine-wave signal.

It further extends to computer software, and a tangible or intangible carrier bearing the same, which, when executed on an electronic device, causes it to carry out this method.

Features of the earlier aspects and embodiments may be features of these aspects and their embodiments too, and vice versa.

In particular, a reference buffer and/or reference bank may be used, as described previously. The proximity detector may be configured a perform a comparison operation between a reference that has a highest confidence score out of all the references in a reference bank and a later-received signal. The device may use this comparison operation to detect proximity of an object to the proximity detector.

The second ultrasonic signals may be transmitted at regular intervals. The sine-wave signal may be transmitted simultaneously with, or overlapping, one or more of the second signals. The sine-wave signal preferably doesn't overlap the second ultrasonic signals in frequency; this simplifies the processing.

The sine-wave signal is preferably used to detect movement of an object which reflects the sine-wave signal back to the electronic device.

The second ultrasonic signals are preferably used to determine distance information relating to an object which reflects the second ultrasonic signals back to the electronic device. However, the second ultrasonic signals may also be used to detect movement.

The sine-wave signal and the second ultrasonic signals are preferably used together to determine the presence of an object satisfying a predetermined proximity test. Such a determination may be used to control an operation of the device, such as disabling (or enabling) a touch or touchless input. However this is not essential, and, where features have been described, with reference to any aspect and embodiment herein, for determining when to enable or disable a touch or touchless input, it will be appreciated that these features may be used in embodiments of the present aspects for detecting the presence of an object, without this necessarily being used by a device to enable or disable a touch or touchless input.

The ultrasonic proximity detector may be used in any electronic device, such as a cell phone.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION OF THE INVENTION

The reader is referred to the applicant's earlier patent publications for implementation details that are the same as have already been described elsewhere. These include WO2006/067436, WO2009/115799, WO2009/122193, WO2009/147398, WO2010/026395, WO2011/004135, WO2011/036486, WO2011/042748, WO2011/042749, WO2011/048433, WO2012/001412, WO2012/017241, WO2012/022979, WO2012/080752, WO2012/131355, WO2012/131359, WO2012/172322, WO2013/045938, WO2013/132241, WO2013/132242, WO2013/132244, WO2013/140130, WO2014/013249 and WO2014/125294, the contents of which are hereby incorporated by reference. This description will therefore concentrate on those details that are specific to the present invention.

Figure 1:
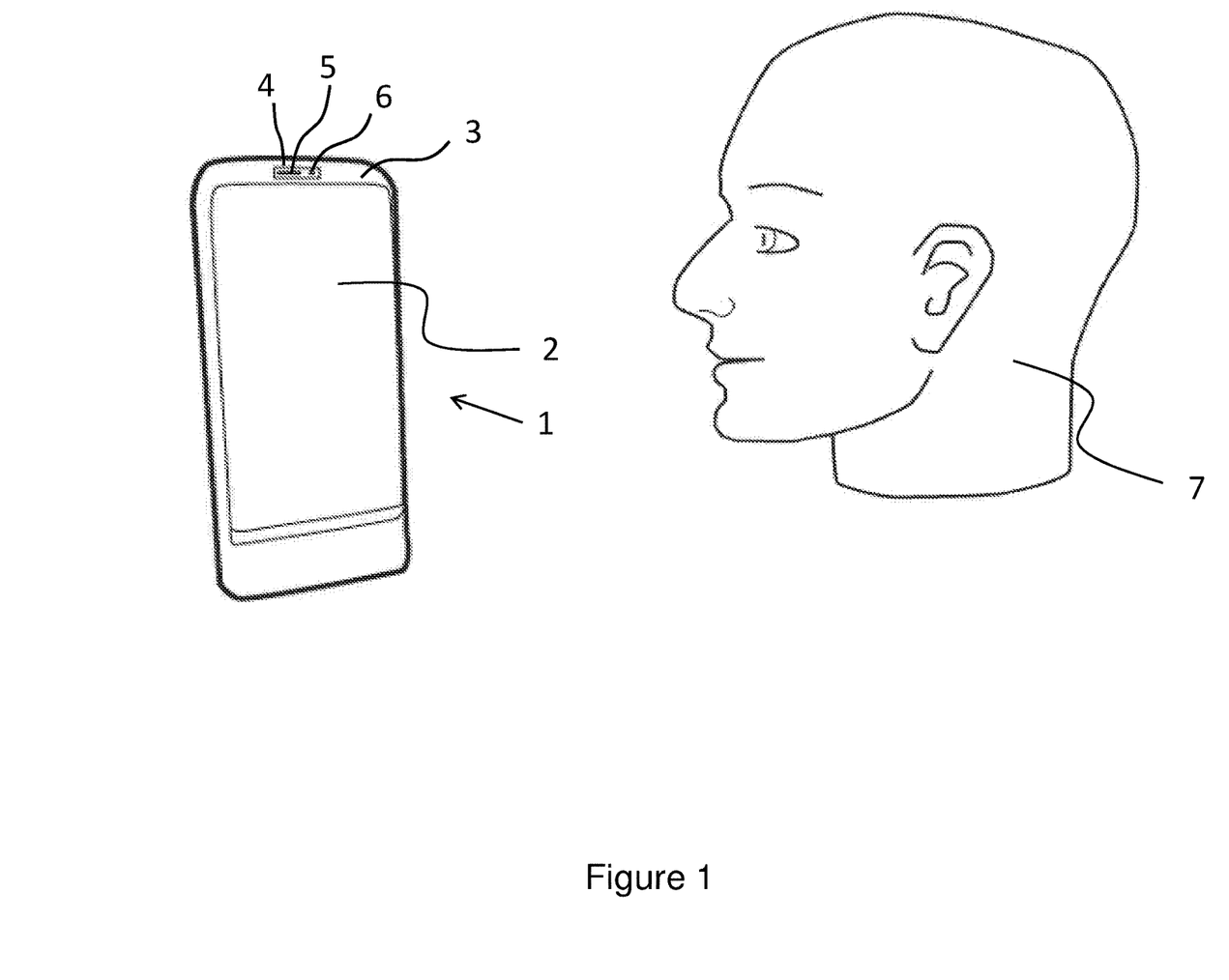
FIG. 1 is a drawing of a mobile phone embodying the invention and a human user.

FIG. 1 shows a mobile phone 1 which has a touch-enabled display screen 2 covered by a sheet of glass 3. An aperture 4 in the glass allows sound to emanate from a loudspeaker 5, and to reach a microphone 6, which are mounted below the glass.

The loudspeaker 5 is able to generate audible and ultrasonic sounds. The microphone 6 can receive ultrasonic signals.

A processing system (not shown) within the phone 1 may include one or more of DSPs, CPUs, ASICs, FPGAs, microcontrollers, digital-to-analog converters, analog-to-digital converters, volatile memory, non-volatile memory, software instructions, and other conventional components. It controls transmissions from the loudspeaker 5, as well as sampling and processing signals received at the microphone 6.

When the processing system determines that the user's head 7 is close to the phone 1, it deactivates the touch input mechanism of the display screen 2. It may also turn off the backlight of the display screen 2. When it determines that the user's head 7 is no longer close to the phone 1, it reactivates the touch input mechanism and the backlight. Other functions may be similarly activated or deactivated—for example, during a call, the phone 1 may automatically enter a speakerphone operation if it detects the user moving the phone 1 away from his head 7.

The processing system causes a continuous sine wave to be emitted from the loudspeaker 5. The frequency of the sine wave may be fixed, or the processing system may select a frequency from time to time—e.g., to avoid interference for other devices, whose presence it may detect using the microphone 6. In some embodiments, multiple sine waves, at different frequencies, may be transmitted simultaneously, to ensure diversity.

The processing system samples ultrasound energy received at the microphone 6. Some of the energy from the transmitted sine wave will travel along a direct path from the loudspeaker 5 to the microphone 6, while some of its energy may be received at the microphone 6 after reflecting off one or more surfaces in the environment, including the user's head 7 when it is close to the phone 1. The signals from the microphone 6 are sampled and processed by the processing system.

When there are no acoustically-reflective objects close to the phone 1, or when any such objects are not moving relative to the phone 1, the frequency of the transmit and return signals will be identical. However, when the input object is moving there will be a shift in frequency for a component of the received signal, the shift being proportional to the speed of the object relative to the phone 1. The Doppler shift in the reflected signal is approximately $\Delta f = 2 f_0 \cdot v/c$, where $f_0$ is the frequency of the transmitted signal, v is the speed of the movement between the object and the phone 1, and c is the speed of sound in air. A positive shift in frequency indicates a movement towards the phone 1, while a negative shift indicates a movement away from the phone 1.

The frequency distribution is computed by taking the Fourier transform of the received signal after down-converting and down-sampling.

Figure 2:
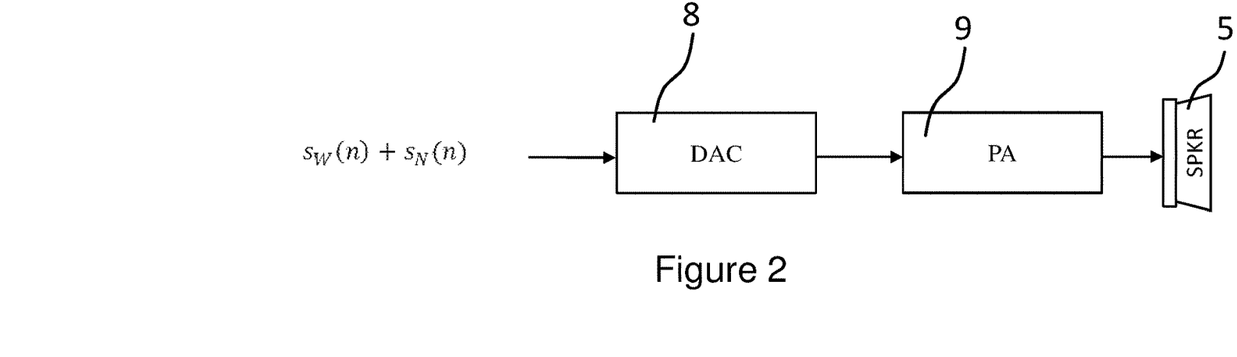
FIG. 2 is a schematic drawing of functional transmitter blocks within the mobile phone.

In one implementation, illustrated in FIG. 2, the phone 1 simultaneously transmits a 30 kHz sine wave, $s_W(n)$, and a periodic chirp signal (or other coded signal), $s_N(n)$. The two signal types can be transmitted sequentially, but preferably they are transmitted in parallel on different frequency bands. In the latter case the tone can be emitted as a continuous signal. Disparate frequency bands ensure no interference between the signal types. The two signals are generated digitally and are then converted to analog by a digital-to-analog converter (DAC) 8. They are then amplified by a power amplifier (PA) 9, and transmitted by the loudspeaker 5.

Figure 3:
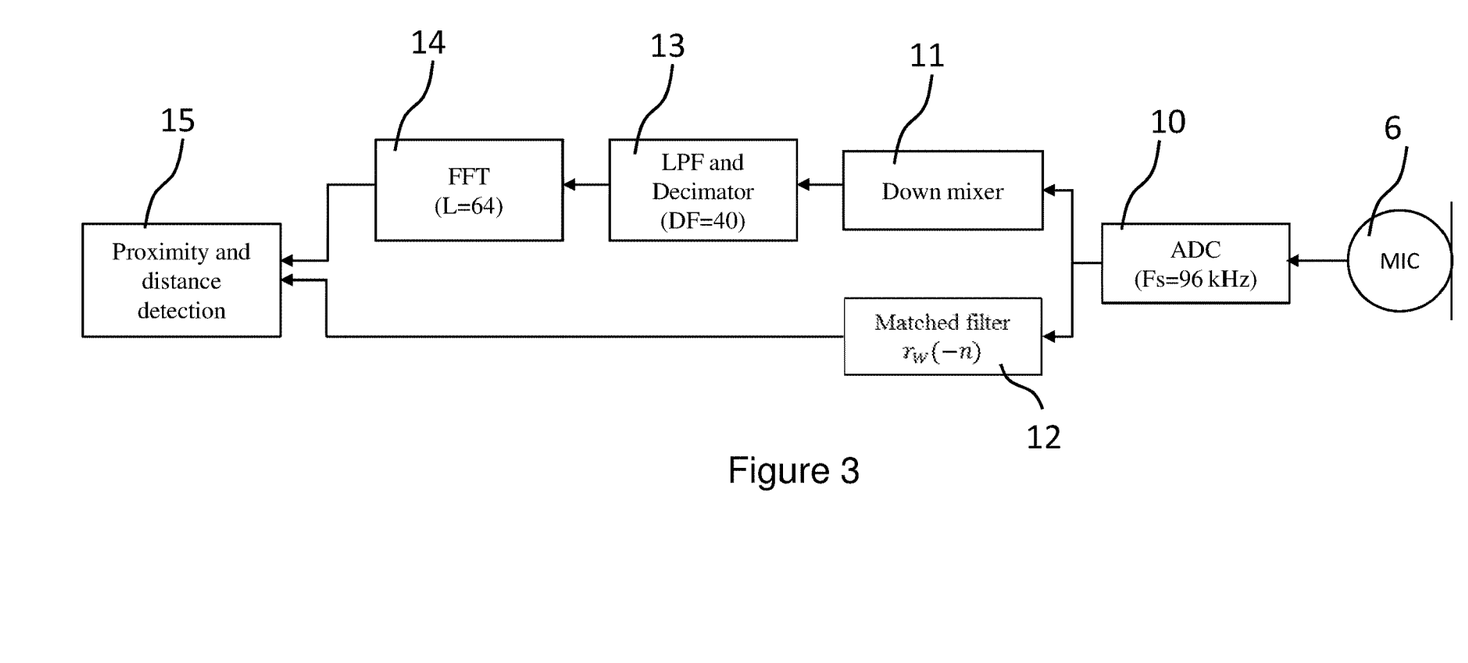
FIG. 3 is a schematic drawing of functional receiver blocks within the mobile phone.

FIG. 3 shows the receive-side components. Signals received by the microphone 6 are sampled and digitized by an analog-to-digital converter (ADC) 10, at a sampling frequency of 96 kHz. The ADC 10 outputs to a down-mixer 11 and also, in parallel, to a matched filter 12, which de-chirps the periodic chirp signals to give impulse response data. The down-mixer 11 converts the signal to complex baseband. The down-mixer 11 outputs to a low-pass filter (LPF) and decimator block 13, which down-samples by a factor of forty. The maximum observable Doppler frequency shift is then 1.2 kHz, which translates into a relative speed of approximately 7 m/s. A fast Fourier transform (FFT) block 14 then computes the Fourier transform on blocks of 60 samples, which correspond to an observation window of 25 ms per frequency estimate. The FFT block 14 and the parallel matched filter 12 both output to a proximity-and-distance-detection block 15. The functional blocks shown in FIG. 3 may be implemented in hardware, in software, or a combination of both.

The proximity-and-distance-detection block 15 analyzes the frequency spectrum information from the FFT block 14 to determine motion information for one or more objects spaced away from the phone 1, based on Doppler shift effects. It may also analyze timing information in the impulse responses output by the matched filter to determine distance information relating to one or more objects spaced away from the phone 1.

Figure 4:
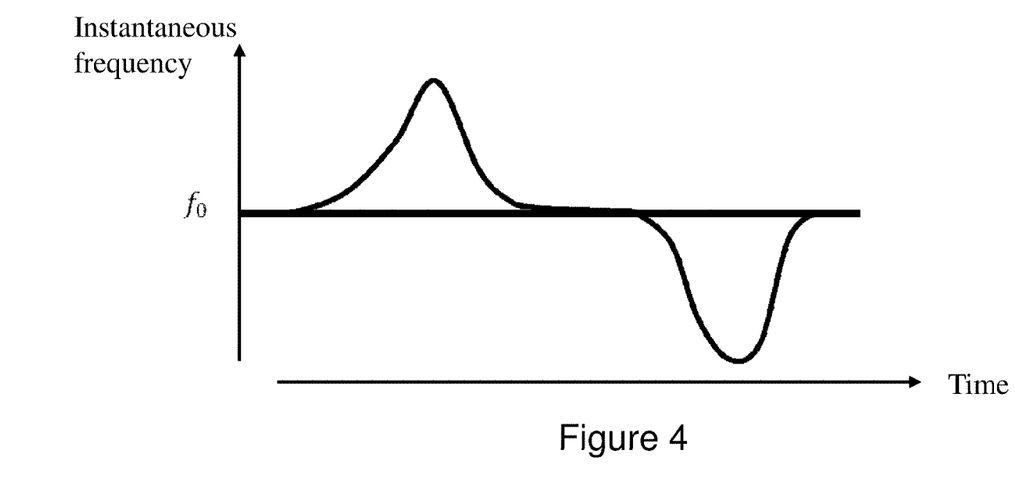
FIG. 4 is a graph of frequency against time for a received sine-wave signal.

Whenever the user brings the phone 1 to his ear, or moves it away from his ear, there will be a distinct and detectable time evolution of frequency shifts in the received signal. FIG. 4 illustrates an example trajectory in the time-frequency plane. Initially, positive shifts are registered as the phone 1 is put to the head 7. The frequency shift then falls to zero as the mobile phone 1 momentarily comes to rest. Finally, negative shifts are registered when the phone 1 is withdrawn. At the same time, there is also a constant contribution with zero shift due to the direct signal from the speaker 5 to the microphone 6, which may be disregarded.

By analyzing the received signal in the time-frequency domain, the relative displacement of the reflector, such as the user's head 7, can be deduced, but not its absolute distance from the phone 1. However, if the phone 1 correctly detects that the user is holding the phone 1 to his ear then the starting position is known, and relative displacement information is sufficient to conclude that the phone has been removed beyond a certain boundary. For inward motions, the lack of absolute distance information is more challenging, and the exact point where proximity is detected cannot be guaranteed, as it will depend on the reflective properties of the approaching object.

To overcome this limitation, the phone 1 uses the chirp signals (or other wider-band signal) to track the distance of a reflective object moving at moderate speed. While the sine wave signal enables detection of very fast movements, the wideband signal is capable of provide accurate distance information when the object is moving at moderate speeds or slower. The Doppler and time-of-flight processing can be performed independently of each other because the two signal types are transmitted on different frequency bands (or, less preferably, at different times).

The wider-band signals make it possible to estimate the distance from the delay between emission and reception of the reflected signal. Specifically, the two-way distance is given by multiplying the elapsed time with of speed of sound. The accuracy with which an echo can be pinpointed in time is determined by the bandwidth of the transmit signal. In a practical system the bandwidth is limited by the sampling frequency and the efficacy of the speaker 5 and microphone 6 at higher signal frequencies. Typically the signal bandwidth can be between 10 kHz and 40 kHz. The transmit signal can be in the form of a short spike, in which case the impulse response is obtained directly (within the bandwidth constraints of the transmit signal). Alternatively, a chirp or another coded signal of longer duration can be applied. The impulse response is then obtained after pulse compression of the received signal. Thus, if $r_j(n)$ is the received signal in response to the jth transmission, the corresponding impulse response estimate is $h_j(n)=\Sigma_k s(k) r_j(k+n)$, where $s(n)$ is the sampled transmit signal.

Coded signals have the advantage that the peak transmit amplitude can be significantly lowered, while maintaining the same resolution and SNR. The first part of the impulse response signal stems from the direct signal path between the speaker and microphone, while contributions from nearby reflectors will appear later in the impulse response signal due to a longer time-of-flight. However, when a reflector is very close to the microphone/speaker setup there will be a substantial overlap between the direct path and the reflector contribution. To accurately identify the distance, or even establishing the presence of a reflector, there is a need for a reference or background model, which can allow the direct-path contribution to be removed from received signal.

Alternatively, the device 1 may use the wide-band signals to look for variations in the received signal between consecutive transmissions. Large variations in the received signal over short time scales are indicative of a moving nearby reflector. This may be used to supplement the Doppler-shift analysis—e.g., by requiring a movement finding from both analyses before inferring anything about the position of the user's head 7. A measure of variation can for example be the energy in the difference signal, i.e. $E=\Sigma_n |r_{j+1}(n)-r_j(n)|^2$, or a similar measure based on the impulse response signals. In both cases it is assumed that the transmit signal between transmissions is constant. Alternatively the transmit signal can be a continuous signal that repeats itself with a certain period.

The results of the sine-wave frequency processing and the wide-band timing processing are preferably combined to give an accurate determination of whether the user's head 7 is close to the phone 1 or not, so that the touchscreen can be disabled or enabled appropriately. The processing system can use inference-based logical rules to use the Doppler-based motion information to make activation/deactivation decisions, such as: if it is detected that the phone is brought to the ear, assume that the phone is at the ear until a corresponding movement away from the phone is detected.

To help determine when phone 1 is not being held to the user's head 7, reference data is collected and stored at intervals in a reference buffer. This may be the set of samples $r_j(n)$ corresponding to the sequence of wide-band transmissions, for instance, or it could be periodic samples taken when just the sine wave is transmitted. When the phone 1 detects an incoming motion relative to the user's head 7, a reference is selected from the reference buffer corresponding to a time instant just prior to the time of the incoming motion. The selected reference is added to a bank of selected references. A confidence value is assigned to each reference in the reference bank and the reference with the highest confidence value is chosen to be representative of the "soundscape" when the phone 1 is not proximate to the user's head 7. This chosen reference is then compared with later-received ultrasound signals to help determine when the phone 1 is removed from the user's head. If the signals received by the phone 1 become sufficiently similar to the chosen reference, this can be used to detect that the phone 1 is no longer in proximity to the user's head 7. This determination may be used in combination with other factors to determine when to enable (or disable) the touchscreen 2.

Every time a new reference is added to the selected-reference data bank, it is compared with the references that are already in the bank. If it is found to be sufficiently similar to a reference that is already in the bank, the old reference is removed and replaced by the new reference. Otherwise, the reference is added as an entirely new reference. The confidence values of the references in the bank are updated based a set of rules. This updating may happen every time a new reference is added. These rules include raising the confidence value of a new reference if it replaces an existing reference data in the reference bank, because they are sufficiently similar. The rules also include gradually reducing the confidence value of all references in the selected-reference data bank as time passes, since older data is considered to be less reliable (e.g., less likely to be reflective of the present ultrasonic reflective environment around the user).

The confidence value assigned to a newly-selected reference may also depend on the amplitude and/or frequency variations in the signal around the time that the reference is captured. Large variations in the components of the received signal for consecutive transmissions (e.g. consecutive pings for chirp transmissions, or between consecutive time windows for a sine signal) indicate the presence of moving reflectors which can reduce the usefulness of the reference data. Therefore a lower confidence value is assigned to a selected reference when the reference displays signal variations that are high (e.g., above a threshold level) compared with the preceding reference or references from the reference buffer.

Additionally, the confidence value of a reference may also depend on the length of the observed incoming motion that triggered the selection of a reference from the reference buffer for inclusion in the reference bank. A short motion results in a lower confidence value since the motion could be triggered by a spurious movement when the user is holding the phone 1 to the head 7. Since Doppler data corresponds to speed data, the length of a motion is essentially given by the integral of Doppler data over time.

Phone 1 may employ a Doppler detection module which only reports Doppler data when the quality of the data is judged to be above a set threshold. The quality of the Doppler data may be determined based on the confidence by the strength of the frequency component that is detected (e.g. the magnitude of an FFT bin). Additionally, the strongest frequency component in the received signal must be focused—e.g., have a peak-to-average magnitude ratio that is above a threshold level. In this way, white noise will be detected as being of low quality since it provides no sharp peak in the frequency domain (although the absolute level can be high).

Figure 5:
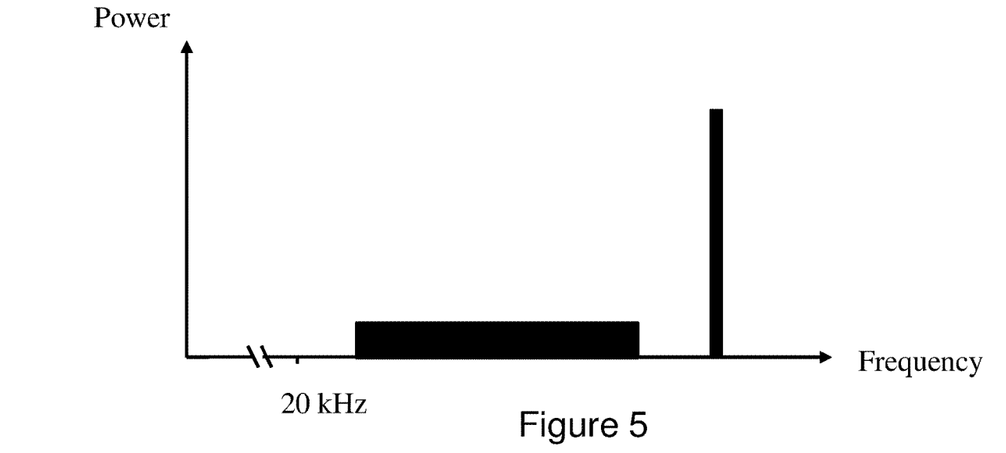
FIG. 5 is a graph of power against frequency for received signals.

FIG. 5 illustrates the power spectral density of a transmit signal containing both a single frequency tone and wideband signal component.

Figure 6:
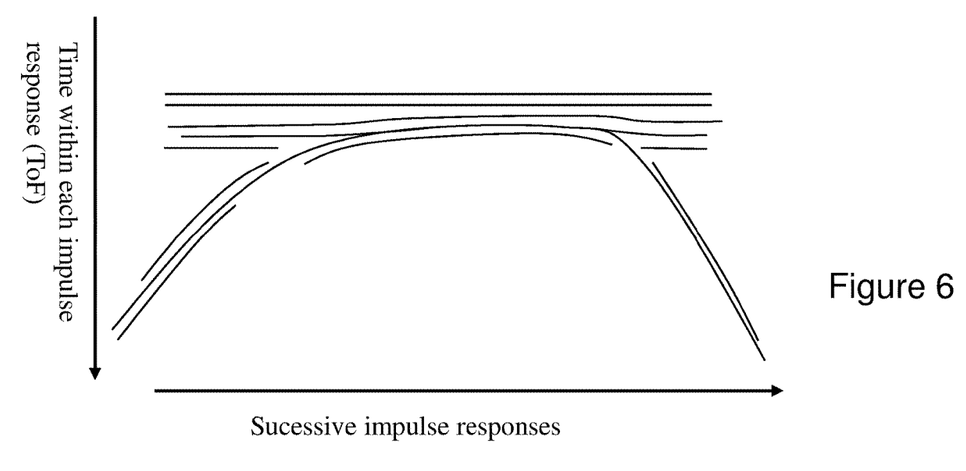
FIG. 6 is an impulse response image generated from successive received reflected signals.

FIG. 6 shows how the sequence of chirp signals may be processed by the phone 1. The echo of each chirp, reflected by the user's head 7 when it is in proximity of the phone 1, can be separated from the direct-path signal by analyzing impulse response images. Impulse response images are 2D arrays where impulse responses are stacked next to each other in chronological order—i.e., the impulse response image can be defined as $[H]_{ij}=h_j(i)$ where $h_j(n)=\Sigma_k s(k) r_j(k+n)$ is the impulse response estimate based on the received signal $r_j(n)$ relating to the jth transmission, where $s(n)$ is the sampled transmit signal.

Figure 7:
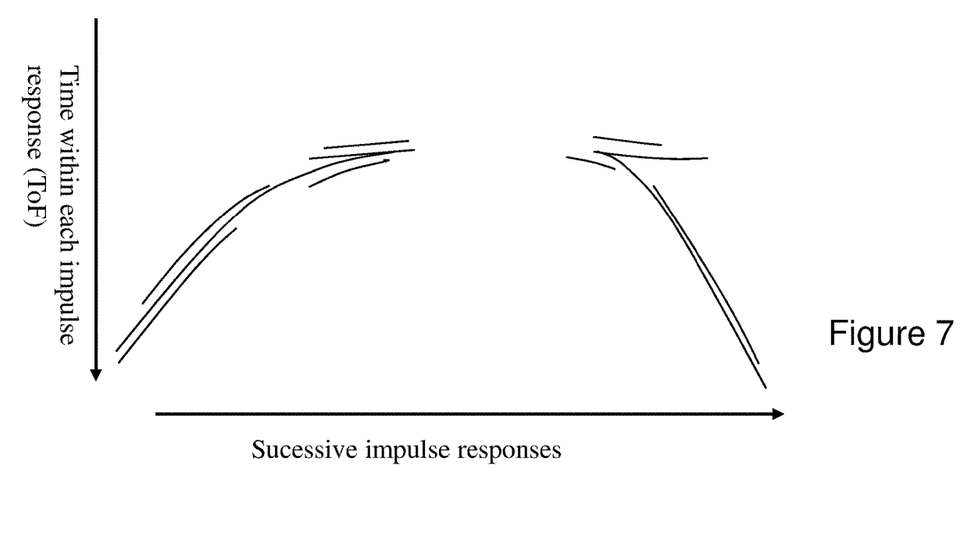
FIG. 7 is the impulse response image after filtering.

The direct signal is seen in FIG. 6 as horizontal lines near the top of the image, since the time of flight for these does not change substantively over time (there may be small changes due to temperature fluctuations, etc.). The echoes from static objects will also have a constant time of flight, which would lead to horizontal lines lower down the image (not present in FIG. 6). However, if the object is moving, the motion curve will have a slope proportional to the speed in the direction of the speaker/microphone pair. FIG. 6 shows the impulse response image obtained from the mobile phone 1 approaching the user's head 7, coming momentarily to rest in close proximity of the speaker/microphone, and then moving away. The signal contribution from the user's head can easily be spotted when the object is moving. In FIG. 7 this is emphasized by applying a set of line filters suppressing horizontal structures, which is an operation that the processing system may apply. Distances on the vertical axis give an indication of the time-of-flight for the chirp signals being reflected off the user's head 7, from which the phone 1 can calculate a distance measure, if desired.

The phone 1 may combine the analyzes from the sine-wave signal and the chirp signals in any appropriate way to make a decision as to whether or not the user's head 7 is close to the phone 1. This test for closeness may be quantifiable in terms of distance, such as being when the user's head is within around five or ten centimeters, or it may be more complex, depending on factors such as the speed with which an object is moving towards or away from the phone 1, and the reflective properties of the object. The decision may be made using any suitable decision process, such as fuzzy logic or a finite state machine.

The same loudspeaker 5, microphone 6 and processing system may optionally also be used to transmit and receive ultrasound signals for touchless control of the unit based on input gestures, for example by a user's hand (not shown).

The invention claimed is:

1. An electronic device comprising an ultrasound transmitter, an ultrasound receiver, and a processing system, the electronic device being arranged to:
   transmit an ultrasonic sine-wave signal from the ultrasound transmitter;
   receive the ultrasonic sine-wave signal, through air, at the ultrasound receiver;
   detect when the frequency of the ultrasonic sine-wave signal as transmitted by the electronic device and a frequency of the ultrasonic sine-wave signal as received by the electronic device satisfy a predetermined difference criterion;
   transmit a second ultrasonic signal from the ultrasound transmitter, the second ultrasonic signal having a wider bandwidth than the transmitted sine-wave signal;
   receive ultrasonic signals, through air, at the ultrasound receiver, arising from the second ultrasonic signal;
   use the received signals arising from the second ultrasonic signal to determine data representative of a distance to an acoustically-reflective surface spaced away from the electronic device; and
   use said distance data and the detection of the predetermined difference criterion to determine whether to disable a touch or touchless input on the electronic device, or to determine whether to enable a touch or touchless input on the electronic device.

2. The electronic device of claim 1, wherein the electronic device is a cell phone.

3. The electronic device of claim 2, wherein the ultrasound transmitter is a loudspeaker that is capable of emitting audible frequencies, and wherein the electronic device is arranged to use the loudspeaker to emit voice signals during a telephone call.

4. The electronic device of claim 2, wherein the ultrasound receiver is a microphone that is capable of receiving audible frequencies, and wherein the electronic device is arranged to use the microphone to receive voice signals during a telephone call.

5. The electronic device of claim 1, wherein the electronic device is a cell phone, and is arranged to transmit the ultrasonic sine-wave signal continuously for a duration of a telephone call.

6. The electronic device of claim 1, arranged to receive the ultrasonic sine-wave signal at the same time as transmitting the ultrasonic sine-wave signal.

7. The electronic device of claim 1, wherein the difference criterion requires the frequency of the transmitted signal and a frequency of the received signal to have a difference that satisfies a set of one or more conditions selected from the group consisting of: to exceed a predetermined minimum threshold; to exceed a predetermined minimum threshold continuously for a predetermined time period; to remain below a predetermined maximum threshold during a predetermined time window; to last for at least a predetermined minimum duration; to last no longer than a predetermined maximum duration; to be positive for at least a minimum time period; to be negative for at least a minimum time period; or to have a minimum integral with respect to time over a time period.

8. The electronic device of claim 1, further comprising a touch-screen, wherein the touch or touchless input comprises part or all of the touch-screen.

9. The electronic device of claim 1, wherein the second ultrasonic signal is a pulse or a chirp.

10. The electronic device of claim 1, arranged to:
store reference data derived from received signals in a reference buffer;
compare data derived from a subsequently-received ultrasonic signal with the stored reference data to determine whether the received signal satisfies a predetermined reference-data difference criterion; and
use said difference determination when determining whether to disable the touch or touchless input, or when determining whether to enable the touch or touchless input.

11. The electronic device of claim 10, wherein the reference data is derived from received signals arising from the transmission, by the electronic device, of ultrasonic signals having a wider bandwidth than the transmitted sine-wave signal.

12. The electronic device of claim 10, arranged to use the predetermined difference criterion relating to a frequency of the received sine-wave signal to determine when to disable the touch or touchless input, and arranged to use a comparison with the stored reference data to determine when to enable the touch or touchless input.

13. The electronic device of claim 10, arranged to select a reference from the reference buffer, for inclusion in a reference bank, in response to determining that a frequency of the received ultrasonic sine-wave signal, received at a time after the signal from which the selected reference is derived was received, and the frequency of the transmitted sine-wave signal satisfy a set of one or more selection conditions.

14. The electronic device of claim 13, wherein the set of one or more selection conditions includes that said received frequency is higher than the transmitted frequency by more than a threshold amount.

15. The electronic device of claim 13, wherein the electronic device is a cell phone and the electronic device is arranged to select a reference from the reference buffer in response to detecting relative movement of a user's head towards the cell phone, wherein the reference is derived from a signal received before a start of the relative movement of the user's head towards the cell phone.

16. The electronic device of claim 13, arranged to:
assign a confidence score to each of the references selected for inclusion in the reference bank; and
compare the data derived from the subsequently-received ultrasonic signal with a reference having the highest confidence score out of the references in the reference bank.

17. A method of controlling an electronic device, comprising:
transmitting an ultrasonic sine-wave signal from the electronic device;
receiving the ultrasonic sine-wave signal, reflected off an object, through air, at the electronic device;
detecting that the frequency of the ultrasonic sine-wave signal as transmitted by the electronic device and a frequency of the ultrasonic sine-wave signal as received by the electronic device satisfy a predetermined difference criterion;
transmitting a second ultrasonic signal from the electronic device, the second ultrasonic signal having a wider bandwidth than the transmitted sine-wave signal;
receiving ultrasonic signals, through air, at the electronic device, arising from the second ultrasonic signal;
using the received signals arising from the second ultrasonic signal to determine data representative of a distance to an acoustically-reflective surface spaced away from the electronic device;
using said distance data and the detection of the predetermined difference criterion to determine whether to disable, a touch or touchless input on the electronic device, or to determine whether to enable a touch or touchless input on the electronic device; and
disabling or enabling the touch or touchless input.

18. A non-transitory computer-readable medium storing computer software which, when executed on a processing system in an electronic device, causes the electronic device to:
transmit an ultrasonic sine-wave signal from an ultrasound transmitter of the electronic device;
receive the ultrasonic sine-wave signal, through air, at an ultrasound receiver of the electronic device;
detect that the frequency of the ultrasonic sine-wave signal as transmitted by the electronic device and a frequency of the ultrasonic sine-wave signal as received by the electronic device satisfy a predetermined difference criterion;
transmit a second ultrasonic signal from the ultrasound transmitter, the second ultrasonic signal having a wider bandwidth than the transmitted sine-wave signal;
receive ultrasonic signals, through air, at the ultrasound receiver, arising from the second ultrasonic signal;
use the received signals arising from the second ultrasonic signal to determine data representative of a distance to an acoustically-reflective surface spaced away from the electronic device;
use said distance data and the detection of the predetermined difference criterion to determine whether to disable a touch or touchless input on the electronic device, or to determine whether to enable a touch or touchless input on the electronic device.

19. The method of claim 17, wherein the electronic device comprises a touch-screen, the method comprising:
receiving the ultrasonic sine-wave signal reflected off a user's head; and
in response to said detection, disabling, or enabling, touch input for said touchscreen.

* * * * *